Figure 1:
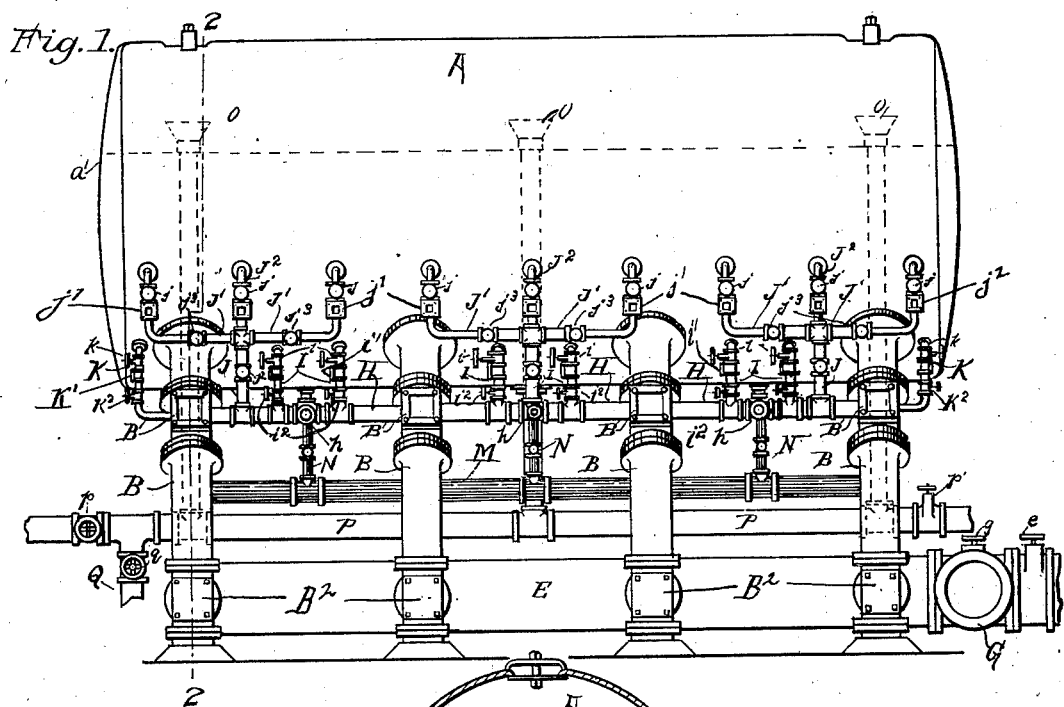

No. 671,023.  
I. H. JEWELL.  
FILTER.  
(Application filed Aug. 10, 1900.)  
Patented Apr. 2, 1901.

(No Model.) 2 Sheets—Sheet 1.

Witnesses:

Inventor:  
Ira H. Jewell.

No. 671,023. Patented Apr. 2, 1901.
I. H. JEWELL.
FILTER.
(Application filed Aug. 10, 1900.)
(No Model.) 2 Sheets—Sheet 2.

Witnesses: Inventor:
Ira H. Jewell.

UNITED STATES PATENT OFFICE.

IRA H. JEWELL, OF CHICAGO, ILLINOIS.

FILTER.

SPECIFICATION forming part of Letters Patent No. 671,023, dated April 2, 1901.

Application filed April 10, 1900. Serial No. 12,320. (No model.)

*To all whom it may concern:*

Be it known that I, IRA H. JEWELL, of Chicago, in the county of Cook and State of Illinois, have invented certain new and useful Improvements in Filters; and I do hereby declare that the following is a full, clear, and exact description thereof, reference being had to the accompanying drawings, and to the letters of reference marked thereon, which form a part of this specification.

This invention relates to improvements in mechanical water-filters of that kind embracing a granular filter-bed, through which the water is passed to remove the impurities therefrom.

The invention relates in certain of its features to the design of filter shown in United States Letters Patent No. 646,837, granted to me April 3, 1900, wherein the filter-screens are accessible from below the filter-bed. In a subsequent application filed by me on the 15th day of March 1900, Serial No. 8,789, I have shown a screen-holder for filters, wherein the screen is accessible and wherein also the screen-holder is constructed to serve as a supporting-column for the filter tank and bed.

One of the objects of the present invention is to provide a construction wherein certain of the screen-holders have the form of tubular supporting-columns for the filter tank and bed and constructed to afford chambers to receive and dispose of the filtered water and with which chambers are connected a plurality of branch pipes leading from the tank and serving to conduct the water from the filter-bed to the chambers in said tubular columns and to distribute the wash-water from said column to all parts of the bed. Said branch pipes may or may not be provided with screens accessible outside of the tank for the purpose of cleansing or replacing the same. I may employ one or more of the combined tubular supporting-columns and screen-holders, and the branch pipes between said tank and columns are so arranged as to communicate with the bed at close intervals, so as to avoid objectionable dead spaces in the lower tank-wall.

A further object of the invention is to provide a construction wherein any desired sectional area of the filter-bed may be washed by the reverse current independently of the other parts of the bed. To this end said column or columns and branch pipes are provided with controlling-valves, whereby any desired number thereof may be cut off from or brought into communication with the filter-tank, thereby permitting sections of the bed to be washed independently of other sections or certain sections to be washed with a larger volume of water than other sections. The tubular columns constitute parts of the filtered-water-effluent pipes, and so far as the last-mentioned feature of the invention is concerned the effluent-pipes need not form any part of the support for the filter bed and tank, but such parts of the filter may be supported by other means.

The invention will be readily understood by reference to the accompanying drawings and subjoined description, and the features of novelty are set forth in the subjoined claims.

Figure 2:
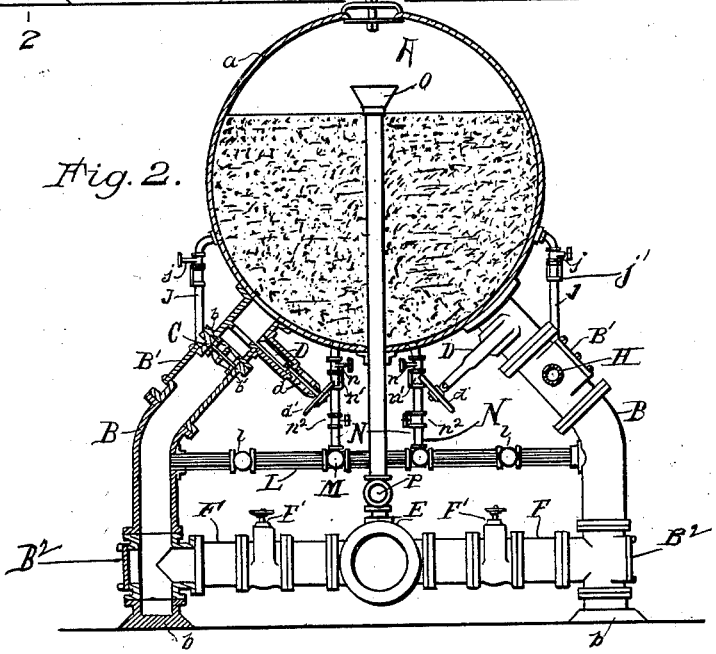
Figure 3:
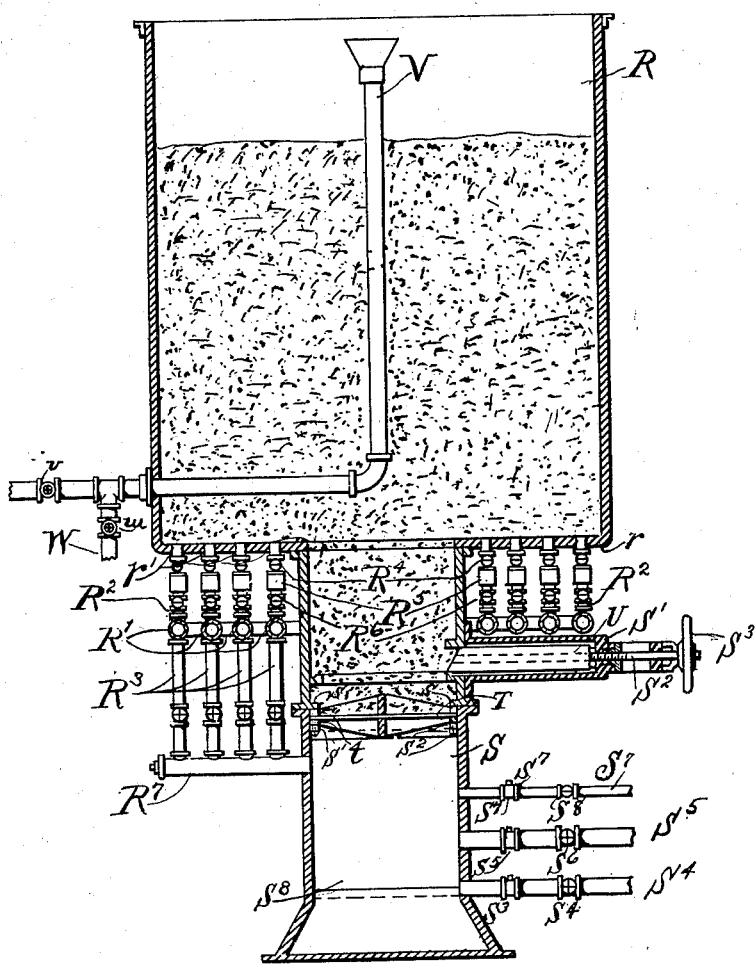
Figure 4:
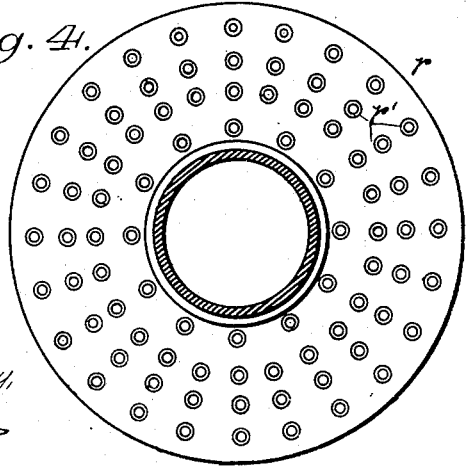

As shown in the drawings, Figure 1 is a side elevation of a horizontal pressure-filter embodying my invention. Fig. 2 is a transverse vertical section taken on line 2 2 of Fig. 1, said line being taken centrally through one of the columns and the other column being shown in elevation. Fig. 3 is a central vertical section of a gravity-filter of the vertical type. Fig. 4 is the bottom plan view of the bottom wall of the tank shown in Fig. 3.

First referring to the construction shown in Figs. 1 and 2 of the drawings, A designates a horizontal cylindric tank comprising a body-wall *a* and closed end walls *a'*. Said tank is approvedly made of sheets of boiler-iron riveted together in the usual manner. B B designate a plurality of upright columns which support said tank. Said columns are made hollow and are in communication with the interior of the tank to receive the water from the filter-bed. Within said tubular columns and preferably near the upper ends thereof are contained screens C, which are shown as made and held in place between upper annular seat *b* and lower lugs *b'*. Above said screens are located sand gates or valves D, the purpose of which is to close the tubular columns above the screens and support the parts of the filter-bed closely adjacent thereto when the screens are removed. The valves D are actuated by rotative screw-shafts *d*, provided with hand-wheels $d'$, projecting from the columns. Each of said columns is provided with hand-holes closed by plates or covers $B'$, which afford access to the screen therein for the purpose of cleansing the same or an egress for the removal of the screen when such removal is desired. The bases of said columns are shown as located laterally outside of the side of the tank, and their upper ends are inclined inwardly to enter the tank near the bottom thereof and at sharp angles to the parts of the walls of the tank pierced thereby. The lower ends of said columns constitute chambers to receive the filtered water, and said columns are connected with a common effluent-pipe E (located, as here shown, under the tank between the columns) by means of cross-pipes F F. Each of said cross-pipes is provided between the pipe E and its column with a controlling-valve $F'$ of any convenient or preferred form, whereby one or any number of the columns may be cut off from the effluent-pipe. Said pipe E is also connected with a wash-water pipe G, and valves $e$ and $g$ are located in the pipes E and G, whereby the pipes E and G may serve alternately to discharge the water from the filter-bed and deliver wash-water thereto. The branch pipes extending between the tank and columns may be variously arranged and connected with said parts. In some cases all the pipes may be connected with the columns, but some of the pipes may be otherwise connected with the common effluent-pipe E. As herein shown, the columns B on each side of the filter are connected by horizontal pipes H, arranged longitudinally of the tank, and said pipes H are provided with two sets of vertical pipes I and J. The pipes I are connected directly at their upper ends with the tank on a line approximately at the level of the upper ends of the columns, and the pipes J are provided at their upper ends with two lateral branches $J'$ $J'$ and a central branch $J^2$, which enter the tank just below the greatest diameter of the tank and are spaced at uniform intervals longitudinally of the tank. Pipes K lead from the outer sides of the end columns toward the end of the tank and enter the tank at the level of the upper ends of the pipes I. Said pipes I J K are provided near the attachment therewith to the tank with said sand-valves $i$ $j$ $k$ and below said valves with screens, (not shown,) which may be made and supported as are the screens of the columns or in any other convenient manner. Said pipes are provided with hand-holes covered by plates $i'$ $j'$ $k'$ to afford access to said screens. The pipes I J K are also provided with controlling-valves $i^2$ $j^2$ $k^2$, whereby water may be cut off from either or a number of the pipes, as desired. Moreover, the branches $J'$ are provided with other controlling-valves $j^3$, whereby the passage of water through said pipes may be independently controlled. The pipes H, connecting the columns, are also provided with controlling-valves $h$, whereby each of said columns may be operated independently of the others.

Each lateral pair of columns B is connected by transverse pipes L, Fig. 2, extending under the tank, and the several pipes L communicate with each other by horizontal pipes M, arranged longitudinally of the tank. As herein shown, two rows of pipes M are provided, one on each side of the plane of the axis of the tank; but a larger number and differently-arranged pipes may be employed to suit the convenience of the designer in each case. N N designate a plurality of vertical pipes, connected at their lower ends with the pipes M, and the upper ends of which enter the bottom of the tank. Said vertical pipes N are provided at their upper ends with sand-valves $n$ and will be provided with screens below the same (not shown) and are further provided below the screens with hand-holes covered by cover-plates $n'$. Below the hand-holes in each pipe N is located a controlling-valve $n^2$, whereby either or all of the pipes may be cut off from the longitudinal pipes M and each used independently of the other. Similarly the transverse pipes L are provided between the columns B and vertical pipes N with controlling-valves $l$, whereby one or more of said columns may be cut out of communication with the intermediate set of pipes N.

The cross-pipes F, connecting the columns with the common effluent-pipe E, enter said columns above the bottom walls $b$ thereof, thereby affording sand-traps at the bases of said columns to catch sand which may escape through the screens into the columns, and said columns are provided at their lower ends with hand-holes closed by cover-plates $B^2$, affording access to the columns for the removal of the sand.

The raw water is delivered to the interior of the tank through one or more vertical pipes O, (three being here shown,) which rise upwardly through the bottom of the tank and the filter-bed and project at their upper ends above the bed. Said delivery-pipes communicate at their lower ends with a horizontal distributing head or pipe P, arranged longitudinally of the filter, and which is adapted for connection at one end with a pipe leading to a source supplying raw water and having a controlling-valve $p$ at said end. Said head is also desirably connected with a wash-water-outlet pipe Q, having a valve $q$ and adapted for connection with a pipe leading to a sewer or other place for the disposal of wash-water. When the filter is in operation, the valve $q$ is closed and the valve $p$ open, and when the filter is being washed by a reverse current passing upwardly through the filter-bed the valve $q$ is open and the valve $p$ is closed.

The operation of the filter is as follows: The raw water is delivered continuously to the filter through the pipes O and is discharged after passing through the filter-bed through the various pipes I, J, K, and N and the tubular columns, passing from said columns through the cross-pipes F to the main effluent-pipe E, and from thence to the storage-reservoir or place of use. By reason of the arrangement of the pipes and columns and the controlling-valves connected therewith I am enabled, should any of the screens require cleansing, to cut off the pipe or pipes containing said screens and clean or replace said screens without interrupting the operation of the other parts of the filter. Moreover, the various pipes leading from the filter are so arranged as to be readily accessible when attention thereto is required and at the same time are connected with a common effluent-pipe, so that the filtered water is easily disposed of. A further and important feature of my invention is that I am enabled, by reason of the peculiar arrangement of the pipes and their valves, to wash sections of the bed independently of other parts thereof, and, furthermore, am enabled to wash any desired sectional area of the bed, either a longitudinal or transverse section, and therefore not confined to sectional washing of given or predetermined areas. A further advantage of the form of filter shown in Figs. 1 and 2 is that the wash-water is directed into and through the bed at convergent angles, thereby insuring when all of the various pipes are open a violent agitation of the bed and consequent thoroughness of the washing. Moreover, I am enabled, by reason of the proper disposition of the discharge-pipes, to place the screens relatively close together, so as to avoid objectionable dead space in the tank, and at the same time the screens are so located as to be readily accessible for cleaning or renewing and without interrupting the operation of the filter as a whole.

In Fig. 3 I have shown my invention applied to an upright filter of the gravity type. Said filter embraces an upright open-topped tank R and a hollow supporting-column S, arranged centrally below the same. Said column is provided with a screen T, held between upper and lower clamping-rings $t$ $t$, interposed between an upper annular seat $s$ and lower lugs $s'$, and held in place by set-screws $s^2$, passing upwardly through the lugs. Above said screen is located a sliding sand-valve U, adapted to close said column above the screen when the screen is to be removed, and which valve is normally contained within a casing S', extending radially from the column. Said valve is actuated to move it into and out of its closing position by means of a screw-shaft $S^2$, provided with a hand-wheel $S^3$ for rotating the same. The column is provided below the screen with a hand-hole covered by a plate $S^8$, located on the farther side of the column, as here shown. $S^4$ designates a filtered-water-effluent pipe leading from the column and provided with a check-valve $s^3$ and controlling-valve $s^4$. $S^5$ designates a wash-water-inlet pipe leading to the column, provided with a check-valve $s^5$ and a controlling-valve $s^6$. $S^7$ designates an air-pipe leading to the column to deliver air to the filter-bed and provided with a check-valve $s^7$ and a controlling-valve $s^8$. The bottom wall $r$ of the tank is herein shown as made flat and is provided with a plurality of openings $r'$, radially outside of the column S, which are connected with screened branch pipes leading from said column. Said branch pipes may be arranged in any suitable manner. As herein shown, I provide four circular concentric distributing pipes or heads R', located below the tank in the same general level with each other and concentric with the column. Said heads are provided with a plurality of vertical pipes $R^2$, which enter the openings $r'$ in the tank-bottom. The heads R' are provided with a plurality of vertical pipes $R^3$ in communication at their upper ends with the heads and at their lower lower ends with a trunk-pipe $R^7$, common to all the vertical pipes, and projecting radially from the columns; but said distributing-heads may be otherwise arranged with respect to their connection with the column as found most convenient. The upper ends of the branch pipes are provided with sand-valves $R^4$, below which, interiorly of the pipes, will be located screens similar in construction and arrangement to the screen T of the column S. Said pipes are provided below the screens therein with hand-holes covered by removable plates $R^5$. Said branch pipes are also provided with controlling-valves $R^6$, by which the flow of the water therethrough may be independently controlled. The pipes $R^3$, connecting the heads with the columns, will also desirably be provided with controlling-valves whereby one or more of the heads and connected branches may be cut out of communication with the column. Water is delivered to the filter-bed by means of a vertical delivery-pipe V, which rises centrally upwardly through the filter-bed, with its upper end projecting above the bed, and said delivery-pipe is directed laterally at its lower end through the side wall of the tank near the lower end thereof and is designed for attachment outside the tank with a pipe connected with a source supplying raw water. Said delivery-pipe is provided at its outer end with a controlling-valve $v$. Desirably, also, a wash-water-outlet pipe W is connected with the delivery-pipe outside the tank and provided with a valve $w$, whereby the pipe V may serve both as the raw-water-delivery pipe and wash-water-outlet pipe, as do the similar pipes O and P of the construction shown in Figs. 1 and 2. The operation of this form of the invention is substantially the same as the form shown in Figs. 1 and 2 and need not be further referred to.

The supporting-columns here shown constitute portions of the filtered-effluent pipes or conduits by which the filtered water is conducted from the filter-bed to a storage-reservoir or place of use, and while it is desirable that said pipes or conduits constitute the support or supports for the filter tank and bed, yet said tank and bed may obviously be otherwise supported and the effluent-pipes otherwise disposed or located.

The type of filter shown in Figs. 3 and 4 may be employed as an individual filter to be used where a filter of small capacity is required, or the filter-bed, bottom, and column, with the associated branch pipes of the construction shown in said figures, may be considered as a section of a filter of large area, wherein a number of columns may be employed.

I claim as my invention—

1. A water-filter comprising a tank a filtered-water-effluent pipe, a plurality of branch pipes outside of said tank connecting said tank with the effluent-pipe, and accessible screens in said branch pipes.

2. A water-filter comprising a tank, a filtered-water-effluent pipe, a plurality of branch pipes connecting said tank with the effluent-pipe, screens in said pipes outside the tank, valves in said pipes between the tank and screens, said several branch pipes being provided below the screens with hand-holes, and removable plates covering said hand-holes.

3. A water-filter comprising a tank, a tubular supporting-column therefor in communication with the tank, an accessible screen in said column, and a plurality of branch pipes connecting said column and tank.

4. A water-filter comprising a tank, a tubular supporting-column therefor in communication with said tank, a plurality of branch pipes connecting said tank with the column and accessible screens in said pipes and column.

5. A water-filter comprising a tank, a tubular supporting-column therefor in communication with said tank, a screen in said column, a plurality of branch pipes connecting said column and tank, screens in said branch pipes, and valves in said columns and branch pipes between the screens and tank.

6. A water-filter comprising a tank, a tubular supporting-column therefor in communication with the tank, a screen in said column, a plurality of branch pipes connecting said column with the tank, screens in said branch pipes, means for closing said column and branch pipes above said screens, said branch pipes and column being provided with hand-holes affording access to said screens, and removable plates closing said holes.

7. A water-filter comprising a tank, a filtered-water-effluent pipe designed for connection with a wash-water-delivery pipe, a plurality of branch pipes connecting said tank with the effluent-pipe, and a controlling-valve in each of said branch pipes.

8. A water-filter comprising a tank, a filtered-water-effluent pipe adapted for connection with a wash-water-delivery pipe, a plurality of screened branch pipes connecting said tank with the effluent-pipe and controlling-valves in said pipes whereby any desired section of the bed may be washed independently of the other parts of the bed.

9. A water-filter comprising a tank, a plurality of tubular screen-holders below the tank, screens in said holders, a filtered-water-effluent pipe common to all the screen-holders, and a valve between each screen-holder and effluent-pipe.

10. A water-filter comprising a tank, a plurality of screen-holders below the tank, screens in said holders, a filtered-water-effluent pipe common to all the screen-holders and designed for communication with a wash-water pipe, and a valve between each holder and effluent-pipe.

11. A water-filter comprising a tank, a plurality of tubular supporting-columns therefor in communication with said tank, accessible screens in said columns, and a common filtered-water-effluent pipe common to all the columns.

In testimony that I claim the foregoing as my invention I affix my signature, in presence of two witnesses, this 5th day of April, A. D. 1900.

IRA H. JEWELL.

Witnesses:
  C. A. NEALE,
  W. L. HALL.